(12) United States Patent
Sankaranarayan et al.

(10) Patent No.: US 10,624,011 B2
(45) Date of Patent: Apr. 14, 2020

(54) SWITCHING BETWEEN NETWORK MEDIA SEAMLESSLY WHILE MAINTAINING A NETWORK CONNECTION

(71) Applicant: Microsoft Technology Licensing, LLC, Redmond, WA (US)

(72) Inventors: Mukund Sankaranarayan, Sammamish, WA (US); Mohammad Shabbir Alam, Redmond, WA (US); Mitesh K. Desai, Sammamish, WA (US); Aman Arneja, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/385,858

(22) Filed: Dec. 20, 2016

(65) Prior Publication Data

US 2018/0176843 A1  Jun. 21, 2018

(51) Int. Cl.
*H04W 36/18* (2009.01)
*H04W 36/00* (2009.01)

(52) U.S. Cl.
CPC ......... *H04W 36/18* (2013.01); *H04W 36/005* (2013.01); *H04W 36/0011* (2013.01)

(58) Field of Classification Search
CPC ............. H04W 36/18; H04W 36/0011; H04W 36/005; H04W 48/18; H04W 52/02; H04W 28/02; H04L 12/931
See application file for complete search history.

(56) References Cited

U.S. PATENT DOCUMENTS

| 7,911,968 | B1 | 3/2011 | Foladare et al. |
| 8,503,340 | B1 | 8/2013 | Xu |
| 2005/0147049 | A1 | 7/2005 | Ganesan |
| 2014/0003263 | A1 | 1/2014 | Sheriff |
| 2014/0056154 | A1 | 2/2014 | Agarwal et al. |

(Continued)

OTHER PUBLICATIONS

"How to Turn On/Off Smart Network Switch", https://crowdsupport.telstra.com.au/t5/Android-KB/How-To-Turn-On-Off-Smart-Network-Switch/ta-p/527803, Published on: Dec. 3, 2015, 4 pages.

(Continued)

*Primary Examiner* — Chuong A Ngo

(57) ABSTRACT

The electronic devices described herein enhance a user experience associated with a network connection by transitioning between networks and/or network media. Determinations to switch from one network to another are based on connection quality factors which are collected and compared to defined connection quality thresholds. The connection quality factors are correlated to the quality of the connection, such that the quality of the connection is optimized by switching networks when the connection to one network is poor but the connection to an alternative network may be better. Further, the switching process between networks and/or network media, particularly between 802.11ad networks and other 802.11 networks, is enhanced such that it is substantially seamless, or unnoticeable to the user. The connection quality-based switching determination and the seamless switching between networks provide a consistent, high quality connection and a satisfying user experience.

20 Claims, 9 Drawing Sheets

(56) References Cited

U.S. PATENT DOCUMENTS

2014/0241183 A1* 8/2014 Comeau ............... H04L 5/0098
                                                                370/252
2015/0009960 A1  1/2015 Surface et al.
2015/0103680 A1  4/2015 Anand et al.
2015/0334640 A1 11/2015 Chow et al.
2016/0088550 A1* 3/2016 Rabii ................... H04W 48/18
                                                                370/310
2017/0245208 A1* 8/2017 Sirotkin ............... H04W 48/14

OTHER PUBLICATIONS

Ruetsch, Liz, "Molex : What's the Difference Between IEEE 802.11ac and 802.11ad", http://mwrf.com/test-amp-measurement/what-s-difference-between-ieee-80211ac-and-80211ad, Published on: Apr. 23, 2013, 3 pages.

* cited by examiner

SWITCHING BETWEEN NETWORK MEDIA SEAMLESSLY WHILE MAINTAINING A NETWORK CONNECTION

BACKGROUND

Electronic devices, such as personal computers, laptops, mobile phones, and the like are increasingly equipped to make use of multiple types of networks to send and receive data. For instance, many devices are equipped to make use of a wide variety of Wi-Fi networks, cellular networks, Bluetooth® networks, etc. Each type of network may require separate hardware, drivers, and/or protocols, as well as having substantial variations in effective range and data speeds, making maintaining a high quality, consistent connection difficult.

Providing a seamless transition between an 802.11ad network and an 802.11ac network is complicated due to the current technology requiring separate hardware and network media. Because the networks may be provided by the same access point and an 802.11ad network has a substantially higher data speed but a smaller effective range, enhancing connection consistency when transitioning between the two networks is important to providing a satisfying user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A computerized method comprises forming, by a processor, a connection to a network, wherein a traffic route of the connection includes a first network media; receiving, by the processor, an indication to switch the traffic route to include a second network media and not the first network media; and switching, at a network media multiplexer, the traffic route to include the second network media and not the first network media based on the received indication, wherein the connection is maintained throughout the switching.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

In FIGS. 1 to 9, the systems are illustrated as schematic drawings. The drawings may not be to scale.

DETAILED DESCRIPTION

The detailed description provided below in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'computing apparatus', 'mobile device' and the like are used herein to refer to any device with processing capability such that it can execute instructions. Those skilled in the art will realize that such processing capabilities are incorporated into many different devices and therefore the terms 'computer' and 'computing apparatus' each may include PCs, servers, laptop computers, mobile telephones (including smart phones), tablet computers, media players, games consoles, personal digital assistants, and many other devices.

The electronic devices described below are configured to enhance user experience associated with a network connection when transitioning between networks and/or network media. Determinations to switch from one network to another are based on connection quality factors which are collected and compared to defined connection quality thresholds. The connection quality factors are correlated to the quality of the connection, such that the quality of the connection is optimized, improved, enhanced, or the like, by switching networks when the connection to one network is poor but the connection to an alternative network may be better. Further, the switching process between networks and/or network media, particularly between 802.11ad networks and other 802.11 networks (e.g., 802.11ac), is enhanced such that it is substantially seamless, or unnoticeable to the user through the use of a network media multiplexer which routes traffic over one of two or more network media but presents higher layers, such as the TCP/IP stack, with an intermediate interface. This insulates the higher layers from the multiple network media on the other side of the multiplexer. The combination of the connection quality-based switching determination and the seamless switching between networks provides a consistent, high quality connection and a satisfying user experience.

Figure 1:
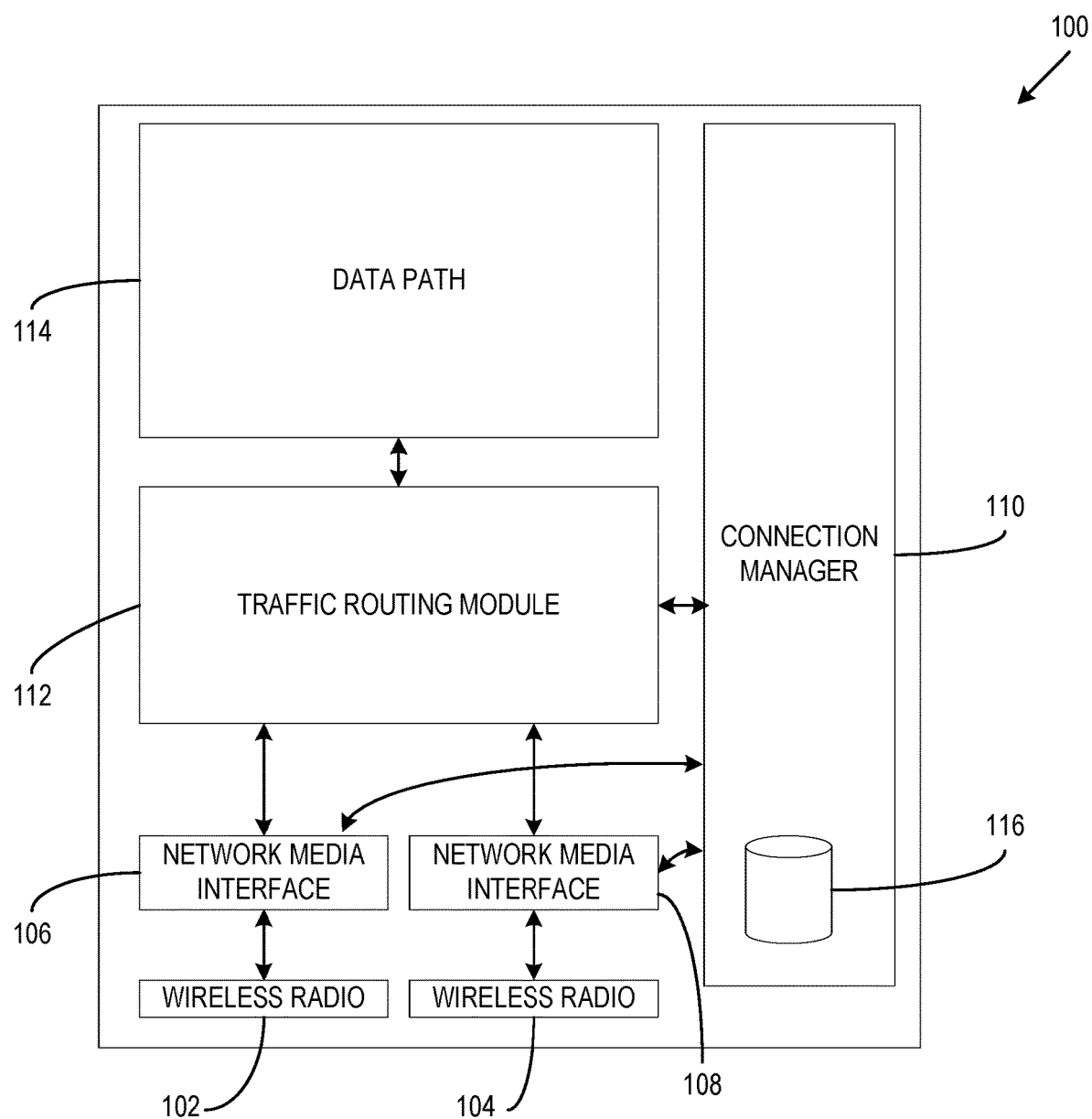
FIG. 1 illustrates a block diagram of an exemplary electronic device including two wireless radios.

FIG. 1 illustrates a block diagram of an electronic device 100 including two wireless radios 102 and 104. The wireless radios 102 and 104 are each connected to one of two network media interfaces 106 and 108 which act as interfaces through which other modules of the electronic device 100 may interact with the wireless radios 102 and 104. A connection manager 110 communicates, controls, and/or interacts with the network media interfaces 106 and 108. Data traffic from the wireless radios 102 and 104 passes through the network media interfaces 106 and 108 into a traffic routing module 112, which routes the data traffic to the data path 114. It should further be understood that the electronic device 100 may be a computing device further including at least one processor, at least one memory, etc. as further described with respect to FIG. 9 below.

In an example, the wireless radios 102 and 104 may each comprise one or more antennas and be configured to operate within one or more electromagnetic frequency ranges and/or channels (e.g., 20 MHz ranges of frequencies, etc.) such that the wireless radios 102 and 104 may receive and/or transmit messages in the form of electromagnetic signals in the frequency channels for which they are configured. Wireless radio 102 may be configured to operate in a first frequency channel, range, or band and wireless radio 104 may be configured to operate in a second frequency channel, range, or band. The frequency channels of the wireless radio 102 and wireless radio 104 may overlap or they may be separate. It should be understood that each wireless radio may be configured to operate in more than one frequency range and/or channel. Further, in an example, the electronic device 100 comprises more than two wireless radios and/or different wireless radios than wireless radio 102 and wireless radio 104.

In an example, wireless radios (e.g., wireless radios 102, 104, etc.) of the electronic device 100 may be configured to operate in wireless network channels, such as Wi-Fi channels, cellular channels, Bluetooth® channels, satellite channels, etc. For instance, wireless radio 102 may be configured to operate in one or more Wi-Fi channels and wireless radio 104 may be configured to operate in one or more cellular channels. Alternatively, the wireless radio 102 may be configured to operate in cellular channels while wireless radio 104 may be configured to operate in Wi-Fi channels. In another example, wireless radio 102 may be configured to operate in channels associated with any 802.11 standard (Wi-Fi at 2.4 GHz and/or 5 GHz such as 802.11ac) other than 802.11ad, and wireless radio 104 may be configured to operate in channels associated with the 802.11ad standard ("Wi-Gig" Wi-Fi at 60 GHz). It should be understood that the wireless radios of the electronic device 100 may be configured to operate in more, fewer, or different combinations of wireless network channels.

The network media interfaces 106 and 108 may include hardware and/or software providing an interface between the wireless radios 102 and 104 and other components of the electronic device, such as the connection manager 110 and/or the traffic routing module 112. In an example, the network media interfaces 106 and 108 may include network interface controllers (NICs), interface drivers, or the like and may be configured to perform some or all of the operations associated therewith.

In an example, the connection manager 110 interacts with the network media interfaces 106 and 108 and the traffic routing module 112 to evaluate a connection routing through a first wireless radio (e.g., wireless radio 102, etc.) based on at least one connection quality factor and, when evaluation of the connection indicates a connection quality of the connection is below a defined threshold based on at least one connection quality factor, switch the connection to route through a second wireless radio (e.g., wireless radio 104, etc.). It should be understood that the connection route may be switched based on any quantity of connection quality factors violating (e.g., being above or below, depending on how the factor is defined) any quantity of defined thresholds. The connection manager 110 may collect and/or track data associated with connection quality factors provided from the network media interfaces 106 and 108 (or other sources, such as user feedback) to assess current connection quality of the associated wireless radios 102 and 104 to make a determination. Further, collected connection quality data may be stored in a connection quality data structure 116 associated with the connection manager 110.

In an example, the connection quality factors may include at least one of link quality, channel noise, channel load, theoretical throughput, and/or actual throughput.

In an example, link quality may be based on received signal strength indicator (RSSI) data. RSSI values may be normalized to fall between 0 and 100, where an RSSI value is close to 100 when the link quality is high. Further, TCP/IP metadata may be accessed to determine layer 2 (L2) or data link layer link quality.

In an example, channel noise may be based on detection of other wireless technologies (e.g., Bluetooth®, microwaves, etc.) that use the same frequency channels as the associated wireless radios. For instance, interference from other wireless technologies may be detected by measuring a normalized frame checksum error count (NFCS) value, which is computed as the ratio of the number of frames with checksum errors to the total number of frames. If the calculated NFCS value is close to zero, the channel noise is low.

In an example, channel load may be based on detecting wireless access points other than the connected wireless access point that are using the same frequency band, range, and/or channel. The number of wireless access points contributing to the channel load may be detected by the wireless radio(s) in conjunction with other components of the electronic device. Fewer wireless access points contributing to channel load typically results in a lower load of the channel. Further, channel load may be detectable through pinging wireless access points to estimate and/or measure queue length at the pinged wireless access points. Channel load may also be assessed via neighbor reports sent by nearby access points and/or evaluating the density of non-access point entities transmitting information in the vicinity.

In an example, theoretical throughput may be based on link speed as defined by the Institute of Electrical and Electronics Engineers (IEEE) specification. Link speed may be based on modulation and coding scheme (MCS) index values, which are the result of a combination of characteristics of a connection or link. A higher MCS index value typically indicates a higher theoretical throughput for the connection. It should be understood that the MCS index values are currently standardly defined and, as a result, understood by a person of ordinary skill in the art.

In an example, actual throughput may be based on address resolution protocol (ARP) latency. ARP latency may be determined based on the time taken to receive an ARP response for the internet protocol (IP) gateway in the network associated with the connection. A longer ARP latency typically indicates that internet traffic through the gateway would have at least that much delay, resulting in a lower actual throughput. Alternatively, a shorter ARP latency (e.g., near zero, etc.) may indicate that the actual throughput of the associated connection is high. In another example, multiple ARP requests and/or cyclic redundancy check (CRC) errors may be collected such that statistics and/or patterns associated with the collected values may be used to determine an actual throughput over a period of time.

It should be understood that, in the examples above, link quality, channel noise, channel load, and theoretical throughput values may be determined directly by hardware of the electronic device 100, or received by another device in communication with the electronic device 100. This other device may be, for example, a device proximate to the electronic device 100 and is configured to determine one or more of the connection quality factors. Determining the actual throughput values may require collection of data and application of heuristics and/or derivation of statistics by software functionality within the connection manager 110. The values of the connection quality factors, once collected, may be stored in the connection quality data structure 116.

In an example, the connection manager 110 may include connections that are "default" connections. For instance, the connection manager 110 may default to a Wi-Fi channel connection over a cellular channel connection (e.g., the Wi-Fi channel connection may be considered cheaper and/or faster than the cellular channel connection), or the connection manager 110 may default to an 802.11ad channel connection over an 802.11ac channel connection (e.g., the 802.11ad channel connection may be considered faster than the 802.11ac channel). Default settings of the connection manager 110 may result in automatic selection of a particular channel connection whenever it is available and of sufficient quality (e.g., the connection quality of the channel connection satisfies connection quality thresholds associated therewith).

In an example, prior to connecting to any connection channel, the connection manager 110 checks the available network media (e.g., network media interfaces 106 and 108, etc.), determines if there are any default network media, determines connection quality of the available network media, and connects to the default network media if the connection quality of the default network media is sufficient. If the connection quality of the default network media is insufficient and the connection quality of another available network media is sufficient, the connection manager 110 connects to the network media with sufficient connection quality.

In an example, the connection manager 110 may include a priority list of connection channels and/or network media, such that a priority order may be followed when determining which connection channel or network media to use. For instance, a priority list may include an 802.11ad connection first, an 802.11ac connection second, and a cellular connection last.

In an example, the connection manager 110 switches a connection route to a cellular connection instead of a Wi-Fi connection when the connection quality of the Wi-Fi connection falls below a connection quality threshold, even if the cellular connection is more expensive than the Wi-Fi connection.

In an example, multiple connection quality factors are considered when determining whether to switch a connection route or channel. Each considered connection quality factor may be evaluated separately against separate thresholds and the decision to switch may be based on how many factors fall below the thresholds and/or to what degree the factors fall below the thresholds.

Alternatively, the connection quality factors may be combined and/or considered together in comparison to one or more combined thresholds (e.g., in a weighted fashion). After combination of the connection quality factors, the result may be compared to the one or more combined thresholds to determine whether to switch connection routes or channels.

In an example, connection quality thresholds may be re-evaluated based on feedback data and/or telemetry. For instance, the electronic device 100 may operate in a "learning mode", such that connection quality factors are tracked and/or collected over time during use of the electronic device 100. Other data may also be gathered, such as location data, application data, and the like. The electronic device 100 may further detect connection failures and record data associated with the connection failures. A connection failure may occur when a low connection quality is detected, a connection error is detected, and/or when a user of the electronic device 100 indicates that the connection quality is insufficient via a user interface of the device. The electronic device 100 may associate the detected connection failures with the connection quality factor values collected at the same point in time and adjust the connection quality thresholds for switching connection channels based on those collected connection quality factor values. In some examples, different electronic devices may detect connection failures at different threshold values, such that the connection quality thresholds that are specific to particular devices may be established.

In an example, a connection failure indication may be received from a user at a point when the link quality factor value of the connection indicates that an RSSI value is 40. A connection quality threshold may be adjusted or created such that, when an RSSI value of 40 or less is detected by a component, the route or channel of the connection may be switched. For example, the switch may be performed by the detecting component as a result of the RSSI value falling to 40, or a suggestion or hint to switch may be provided to the connection manager 110 which makes the decision to switch the connection. Other data may also be used, such as detecting when the electronic device 100 is moving away from a Wi-Fi access point based on collected location data, resulting in the connection manager 110 switching the connection to route through a cellular channel to maintain and/or improve connection quality as the electronic device 100 exits the effective range of the Wi-Fi access point.

In an example, the electronic device 100 may further be in "implementation mode" after thresholds have been established, whether they are established based on previously defined connection quality factor thresholds or based on connection failures detected while the electronic device 100 was previously in "learning mode" as described above. In implementation mode, the connection manager 110 evaluates connection quality and switches between connection channels based on the defined connection quality factor thresholds.

It should be understood that while the connection quality data may be specific to a particular user and/or the electronic device 100 when the connection quality data is collected by the electronic device 100, the collected connection quality data may also be shared among other users and/or other devices, as well as with device manufacturers and the like. The data may be used to adjust and/or refine thresholds on similar devices, devices in similar locations, users with similar network bandwidth usage patterns, default thresholds on devices, etc.

In an example, the traffic routing module 112 may receive flows of data from one or both of the network media interfaces 106 and 108. The traffic routing module 112 may route one or more of the received data flows to the data path 114. The route selected by the traffic routing module 112 may be indicated by the connection manager 110. For instance, when the connection manager 110 determines that a switch from wireless radio 102 to wireless radio 104 is necessary based on connection quality, it may instruct the traffic routing module 112 to route the flow of data to and from the network media interface 108 rather than the network media interface 106. The traffic routing module 112 is described in greater detail below in the description of FIG. 4.

The data path 114 represents the modules and/or components that may make up a general path or flow of data in a computing device. For example, the data path 114 may include layers of a transmission control protocol/internet protocol (TCP/IP) stack, applications, interfaces, and the like. It should be understood that the data path encompasses other layers, locations, and/or components of the electronic device 100 where data being sent and received over the wireless radios 102 and 104 may originate and/or be bound.

Figure 2:
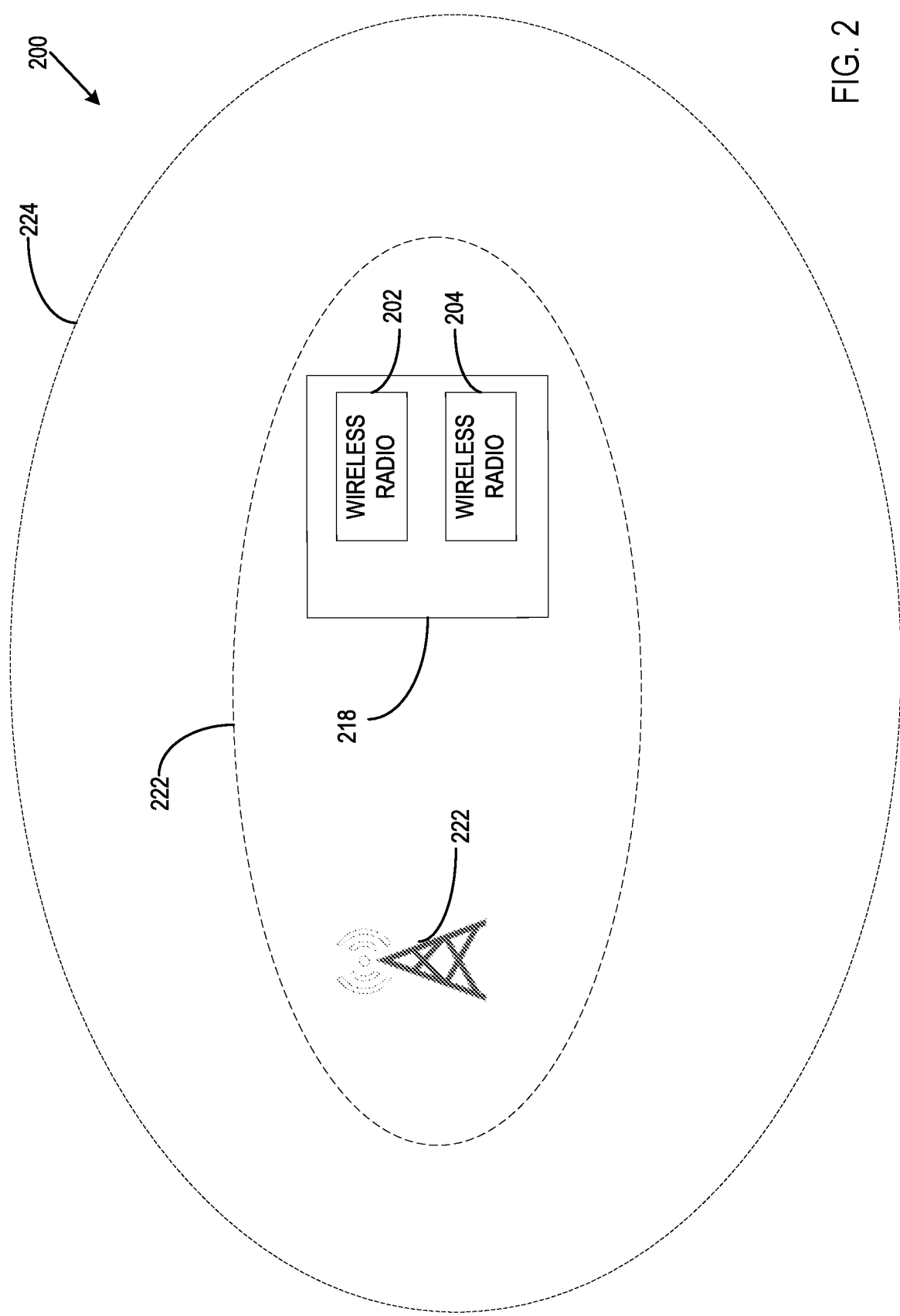
FIG. 2 illustrates a block diagram of an exemplary electronic device positioned in range of a multi-channel wireless access point.

FIG. 2 illustrates a block diagram 200 of a computing device 218 (which may comprise the electronic device 100 as described above) positioned in range of a multi-channel wireless access point 220. The computing device 218 includes a wireless radio 202 and a wireless radio 204. The access point 220 provides a first channel 222 and a second channel 224 for connection. One of the wireless radios (e.g., radio 202 or 204, etc.) of the computing device 218 may be configured to operate on the first channel 222 and the other wireless radio (e.g., radio 204 or 202, etc.) of the computing device 218 may be configured to operate on the second channel 224.

In an example, the first channel 222 has an effective range entirely within the effective range of the second channel 224, as shown in FIG. 2. The computing device 218 is shown inside the effective range of both the first channel 222 and the second channel 224. If the computing device 218 has a connection via the first channel 222 and exits the effective range of the first channel 222, the computing device 218 may switch the connection to make use of the second channel 224 as described throughout this application.

In an example, the first channel 222 is a 60 GHz Wi-Fi (Wi-Gig) channel and the second channel 224 is at least one of a 2.4 GHz Wi-Fi channel or a 5 GHz Wi-Fi channel.

Figure 3:
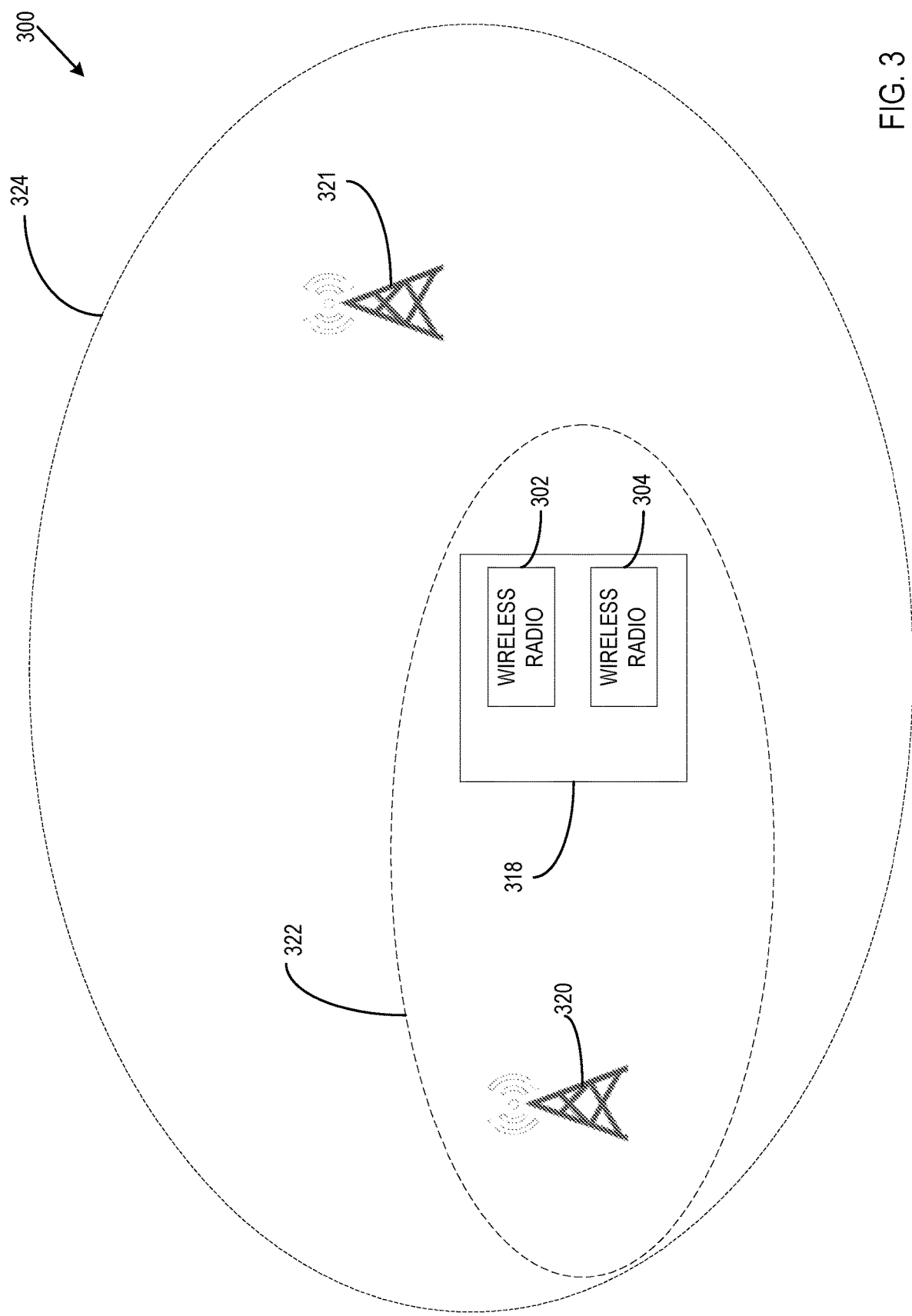
FIG. 3 illustrates a block diagram of an exemplary electronic device positioned in range of a first access point and a second access point.

FIG. 3 illustrates a block diagram of a computing device 318 (which may comprise the electronic device 100 as described above) positioned in range of a first access point 320 and a second access point 321. The computing device 318 includes a wireless radio 302 and a wireless radio 304. The access point 320 provides a first channel 322 for connection and the access point 321 provides a second channel 324 for connection. One of the wireless radios (e.g., radio 302 or 304, etc.) of the computing device 318 may be configured to operate on the first channel 322 and the other wireless radio (e.g., radio 304 or 302, etc.) of the computing device 318 may be configured to operate on the second channel 324.

In an example, the first channel 322 has an effective range entirely within the effective range of the second channel 324, as shown in FIG. 3. The computing device 318 is shown inside the effective range of both the first channel 322 and the second channel 324. If the computing device 318 has a connection via the first channel 322 and exits the effective range of the first channel 322, the computing device 318 may switch the connection to make use of the second channel 324 as described throughout this application. It should be understood that, in alternative examples, the effective range of channel 322 may not be entirely within the effective range of channel 324. The effective ranges of channels 322 and 324 may partially overlap or not overlap at all.

In an example, the first channel 322 is a Wi-Fi frequency channel and the second channel 324 is a cellular frequency channel.

Figure 4:
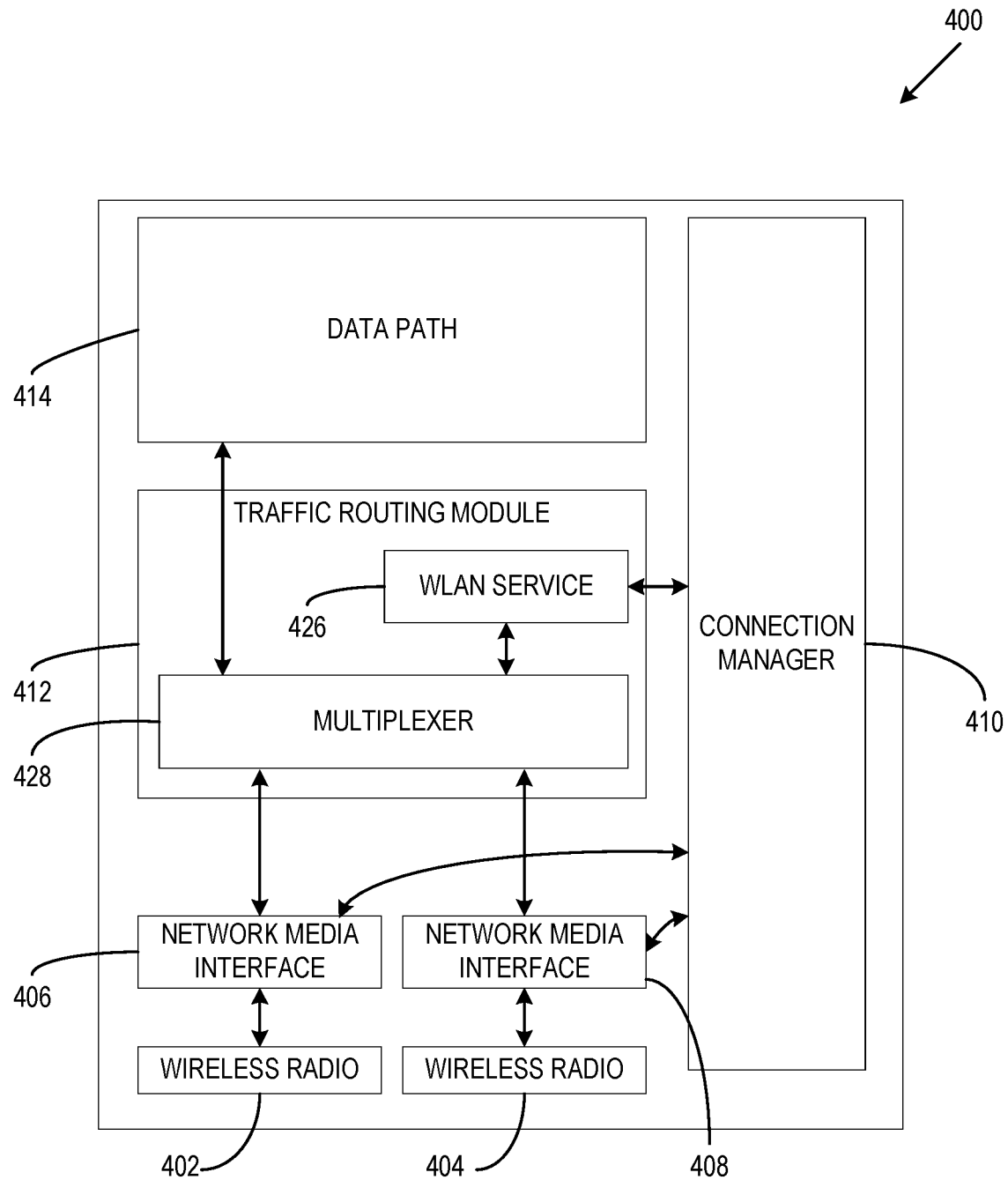
FIG. 4 illustrates a block diagram of an exemplary electronic device including a wireless connection multiplexer.

FIG. 4 illustrates a block diagram of an electronic device 400 including a wireless connection multiplexer 428. It should be understood that components of the computing device 400 may be substantially similar to the equivalent components of the electronic device 100 described above. For instance, the wireless radios 402 and 404 are each connected to one of two network media interfaces 406 and 408 which provide interfaces through which other modules of the electronic device 400 may interact with the wireless radios 402 and 404. A connection manager 410 communicates, controls, and/or interacts with the network media interfaces 406 and 408. Data traffic from the wireless radios 402 and 404 passes through the network media interfaces 406 and 408 into a traffic routing module 412, which routes the data traffic to the data path 414. It should also be understood that the electronic device 400 may be a computing device further including at least one processor, at least one memory, etc. as further described with respect to FIG. 9 below.

In an example, the wireless radios 402 and 404 may each comprise one or more antennas and be configured to operate within one or more electromagnetic frequency ranges and/or channels (e.g., the wireless radios 402 and 404 may receive and/or transmit messages in the form of electromagnetic signals in the frequency channels for which they are configured, etc.). Wireless radio 402 may be configured to operate in a first frequency channel and wireless radio 404 may be configured to operate in a second frequency channel. The frequency channels of the wireless radio 402 and wireless radio 404 may overlap or they may be separate. It should be understood that each wireless radio may be configured to operate in more than one frequency range and/or channel. Further, in an example, the electronic device 400 comprises more than two wireless radios and/or different wireless radios than wireless radio 402 and wireless radio 404.

In an example, wireless radios (e.g., wireless radios 402, 404, etc.) of the electronic device 400 may be configured to operate in wireless network channels, such as Wi-Fi channels, cellular channels, Bluetooth® channels, satellite channels, etc. For instance, wireless radio 402 may be configured to operate in channels associated with 802.11 standards (Wi-Fi at 2.4 GHz and/or 5 GHz) other than 802.11ad, and wireless radio 404 may be configured to operate in channels associated with the 802.11ad standard ("Wi-Gig" Wi-Fi at 60 GHz). It should be understood that the wireless radios of the electronic device 400 may be configured to operate in more, fewer, or different combinations of wireless network channels.

The network media interfaces 406 and 408 may include hardware and/or software providing an interface between the wireless radios 402 and 404 and other components of the electronic device, such as the connection manager 410 and/or the traffic routing module 412. In an example, the network media interfaces 406 and 408 may include network interface controllers (NICs), interface drivers, or the like and may be configured to perform some or all of the operations associated therewith.

In an example, the connection manager 410 interacts with the network media interfaces 406 and 408 and the traffic routing module 412 to evaluate a connection routing through the first wireless radio (e.g., wireless radio 402, etc.) based on at least one connection quality factor and, when evaluation of the connection indicates a connection quality of the connection is below a defined threshold based on the at least one connection quality factor, switch the connection to route through the second wireless radio (e.g., wireless radio 404, etc.). The connection manager 410 may behave in substantially the same manner as the connection manager 110 described above. Alternatively, a component in communication with the connection manager 410 performs these operations, and communicates the results as a suggestion or hint to the connection manager 410 to switch the connection.

In an example, the traffic routing module 412 may receive flows of data from one or both of the network media interfaces 406 and 408. The traffic routing module 412 may route one or more of the received data flows to the data path 414. The route selected by the traffic routing module 412 may be indicated by the connection manager 410. For instance, when the connection manager 410 determines that a switch from wireless radio 402 to wireless radio 404 is necessary based on connection quality, it may instruct the traffic routing module 412 to route the flow of data to and from the network media interface 408 rather than the network media interface 406. The traffic routing module 412 includes a wireless local area network (WLAN) service 426 and a wireless connection multiplexer 428. The WLAN service 426 controls the multiplexer 428 and the multiplexer 428 operates by providing an intermediate network interface to the data path 414. Based on instructions/commands received from the WLAN service 426, the multiplexer 428 routes data traffic through either network media interface 406 or network media interface 408.

In an example, the WLAN service 426 may receive an instruction that the channel on which the traffic is being routed should be switched from the connection manager 410. The channel switch indication may be received as a result of a connection quality determination as described above with respect to FIG. 1. Upon receiving a channel switch instruction, the WLAN service 426 may initiate a channel switch via the multiplexer 428.

The data path 414 represents the modules and/or components that may make up a general path or flow of data in a computing device. For example, the data path 414 may include layers of a transmission control protocol/internet protocol (TCP/IP) stack, applications, interfaces, and the like. It should be understood that the data path encompasses other layers, locations, and/or components of the electronic device 400 where data being sent and received over the wireless radios 402 and 404 may originate and/or be bound.

It should be understood that the components, layers, modules or the like in the data path 414 access network traffic via the interface provided by the multiplexer 428 and are not aware that there are two possible network media interfaces 406 and 408 that may be in use for routing the network traffic.

In an example, a network connection formed within the data path 414 (e.g., according to TCP/IP protocols, etc.) may be maintained throughout the channel switch process. The multiplexer 428 presents a single interface to the data path 414, regardless of whether the data is routed via the network media interface 406 or the network media interface 408.

It should be understood that a channel switch may only occur when an alternative channel to the current channel is available. For instance, if the electronic device is within an effective range of an access point that provides a frequency channel that is compatible to the wireless radio 402 but there is no frequency channel available that is compatible to the wireless radio 404, a channel switch cannot occur. The WLAN service 426 and/or the connection manager 410 may monitor or otherwise observe network media interfaces 406 and 408 for availability of compatible frequency channels over time so that channel switches may be initiated as necessary or when possible.

In an example, when a channel switch instruction or request is received, the WLAN service 426 may confirm that an alternative frequency channel and/or access point is available prior to rerouting the data flow away from the current frequency channel. The WLAN service 426 may exchange preliminary communications with the access point providing the alternative frequency channel to confirm and/or prepare the access point to receive the rerouted data flow. Once the preliminary communications are complete and the WLAN service 426 has confirmed that the access point is prepared to receive the data flow, the WLAN service 426 may instruct the multiplexer 428 to route the data flow over the network media interface associated with the alternative frequency channel. It should be understood that, to provide a substantially seamless transition from one frequency channel to another, the multiplexer 428 may redundantly route at least some data over both network media interfaces during the channel switch process.

In an example, the first wireless radio 402 is configured for a first frequency channel and the second wireless radio 404 is configured for a second frequency channel. The electronic device 400 comprises at least one processor and at least one memory comprising computer program code configured for execution by the processor. The electronic device 400 forms a connection according to a network protocol, wherein a connection traffic route of the connection includes the first wireless radio 402. The WLAN service 426 may cause the connection to be formed over the network media interface 406 and the wireless radio 402. The connection is provided to the data path 414 via the multiplexer 428. Further, the WLAN service 426 may receive a channel switch instruction from the connection manager 410. Based on the channel switch instruction, the WLAN service 426 may cause the connection traffic route of the connection to be switched to include the second wireless radio 404 (and the network media interface 408, etc.) via the multiplexer 428. The connection provided to the data path 414 is maintained throughout the switch of the connection traffic route.

In a further example, the network protocol of the connection formed is TCP/IP.

In a further example, the first frequency channel is a 60 GHz Wi-Fi (Wi-Gig) frequency channel and the second frequency channel includes at least one of a 2.4 GHz Wi-Fi frequency channel and/or a 5 GHz Wi-Fi frequency channel.

In a further example, forming a connection according to network protocol includes associating an Internet protocol (IP) address with the electronic device 400 and wherein the IP address associated with the electronic device 400 is maintained throughout switching the connection traffic route.

In a further example, the first wireless radio 402 is configured for the IEEE 802.11ad standard and the second wireless radio 404 is configured for the IEEE 802.11ac standard.

In a further example, prior to the formation of the connection, the first wireless radio 402 is identified as available for connection. Then, a connection interface associated with the first wireless radio 402 is provided to a network layer associated with the network protocol in the data path 414, wherein, forming a connection according to the network protocol includes forming a connection according to the network protocol in the network layer associated with the network protocol using the provided connection interface.

In a further example, the connection interface is maintained throughout the switching of the connection traffic route.

Figure 5:
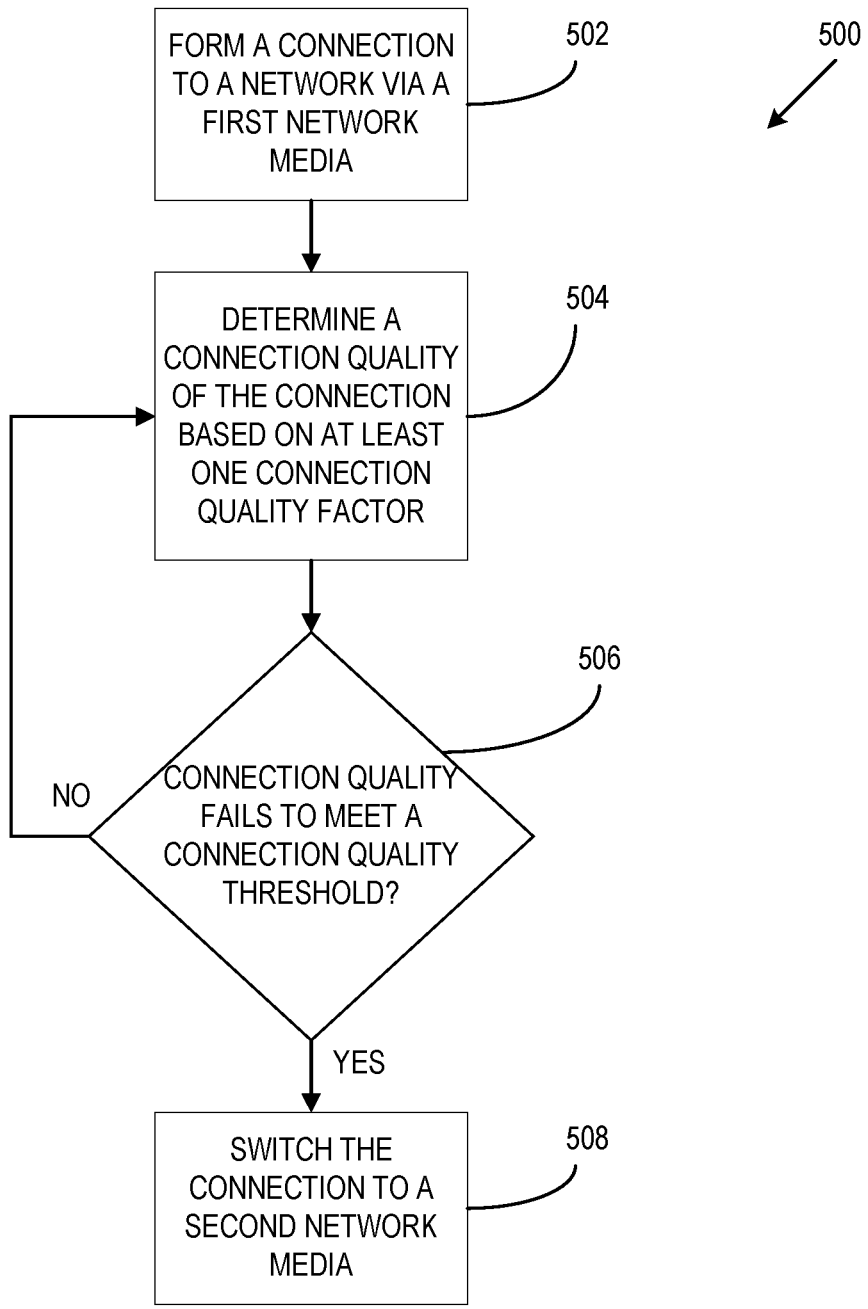
FIG. 5 illustrates a flow chart of an exemplary method of switching a connection to a second network media based on connection quality.

FIG. 5 illustrates a flow chart of a method 500 of switching a connection to a second network media based on connection quality. At 502, a connection is formed to a network via a first network media. At 504, a connection quality of the connection is determined based on at least one connection quality factor. If, at 506, the connection quality fails to meet a connection quality threshold, then, at 508, the connection is switched to a second network media. If the connection quality meets the connection quality threshold, connection quality continues to be monitored, as at 504.

In a further example, the at least one connection quality factor includes at least one of a signal strength factor (e.g., evaluated based on RSSI), a channel noise factor (e.g., evaluated based on a normalized frame check sum error count), a channel load factor (e.g., evaluated based on detecting other access points and devices using the first frequency channel), a theoretical throughput factor (e.g., evaluated based on a modulation and coding scheme (MCS) index of the connection) and/or an actual throughput factor (e.g., evaluated based on an address resolution protocol (ARP) latency of the connection). Still further, the actual throughput factor may be evaluated based on cyclic redundancy check (CRC) errors of the connection. Also, a connection quality factor may be based on implicitly or explicitly provided/advertised channel information from applications and/or other devices.

Each of a plurality of connection quality factors may be evaluated separately or in combination.

In an example, the defined threshold includes a signal strength factor value that is an RSSI value between a first signal strength threshold and a second signal strength threshold (e.g., 20 and 70, etc.) and at least two of a current link speed factor value below a link speed threshold (e.g., 11 Mbps, etc.), a channel noise factor value greater than a channel noise factor (e.g., 0.8, etc.), and an actual throughput factor value that is an ARP latency value greater than a latency threshold (e.g., two seconds, etc.).

In another example, the defined threshold includes a signal strength factor value of an RSSI value below a signal strength threshold (e.g., 20, etc.) and at least one of a current link speed factor value below a link speed threshold (e.g., 11 Mbps, etc.), a channel noise factor value greater than a channel noise threshold (e.g., 0.8, etc.), and an actual throughput factor value of an ARP latency value greater than a latency threshold (e.g., two seconds, etc.).

In another example, the defined threshold includes a signal strength factor value that is an RSSI value below a signal strength threshold (e.g., 70, etc.) and at least one of a current link speed factor value associated with the first wireless radio that is less than a current link speed factor value associated with the second wireless radio, a channel noise factor value associated with the first wireless radio that is greater than a channel noise threshold (e.g., 0.2, etc.), and a channel load factor value greater than a channel load threshold (e.g., 50%, etc.).

If a first frequency channel is at least one of a higher theoretical throughput channel than the second frequency channel or a cheaper channel than the second frequency channel, the electronic device defaults to use of the first frequency channel when available.

In some examples, weights may be assigned to the various factors such that, when the factors conflict, the weights may be considered in order to select the best channel and/or media. For instance, signal strength may be more heavily weighted than a cost factor.

Figure 6:
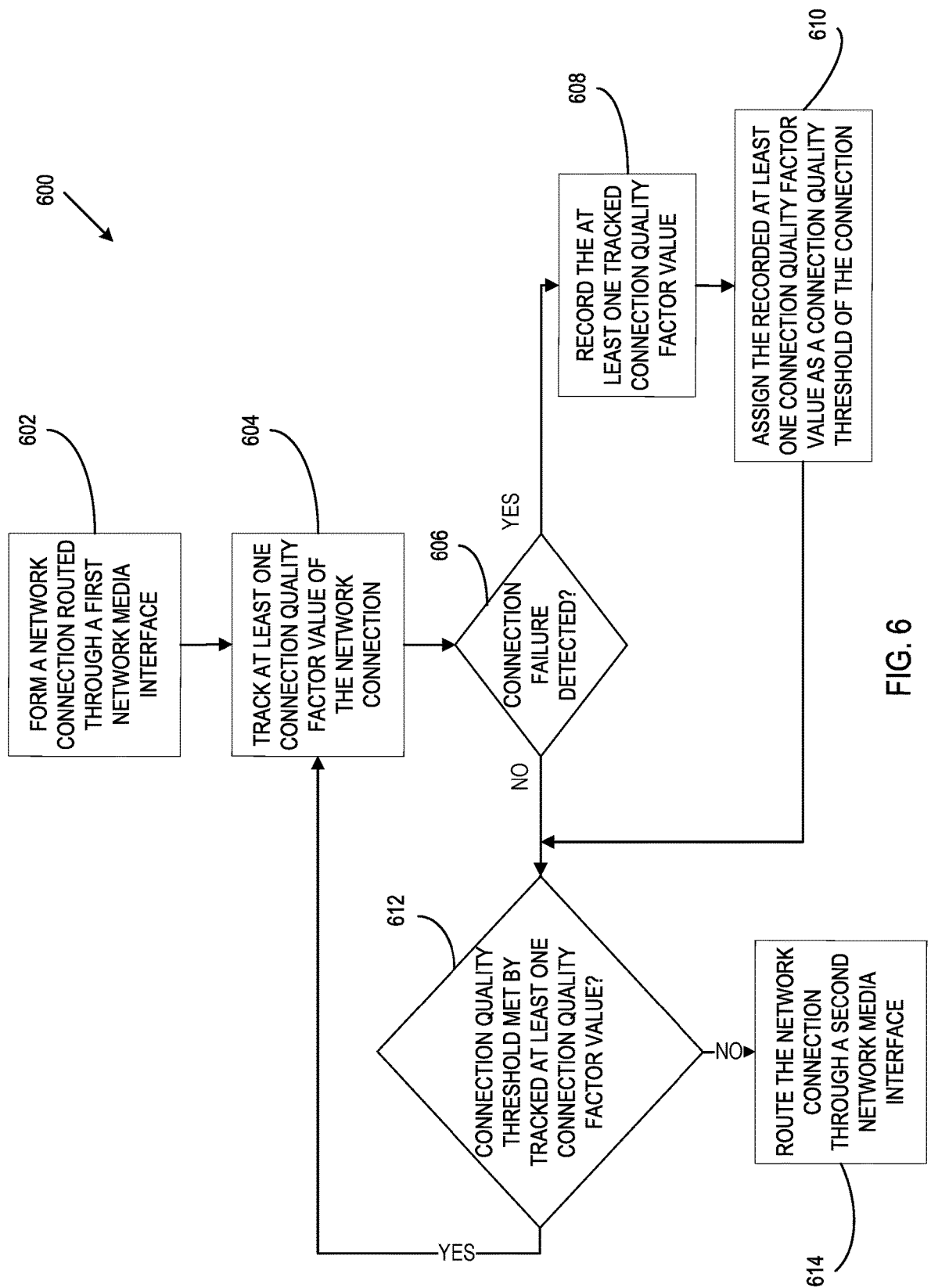
FIG. 6 illustrates a flow chart of an exemplary method of detecting connection failure, recording tracked connection quality factor values, and switching a connection to a second network media based on at least one connection quality factor threshold.

FIG. 6 illustrates a flow chart of a method 600 of detecting connection failure, recording tracked connection quality factor values, and switching a connection to a second network media based on at least one connection quality factor threshold. At 502, a network connection is formed that is routed through a first network media interface. At 504, at least one connection quality factor value of the network connection is tracked. If a connection failure is detected at 606, the at least one tracked connection quality factor value is recorded. At 608, the at least one recorded connection quality factor value is assigned as a connection quality threshold of the network connection.

If no connection failure is detected at 606, or after a connection quality threshold is assigned at 610, the connection quality threshold is checked at 612. If the connection quality threshold is met by the tracked connection quality factor value at 612, the connection quality factor value continues to be tracked at 504. If the connection quality threshold is not met by the tracked connection quality factor value at 612, the network connection is routed through a second network media interface.

The connection failure of the connection may be detected based on at least one of user input, connection latency, silence on the channel and/or connection, or connection error. The connection failure may also be detected based on user input when a user selects to use the second network media interface.

In a further example, a geographic location is recorded when a connection failure of the connection is detected. The recorded geographic location may be associated with the connection quality threshold of the network connection. Routing the network connection through a second network media connection, when the tracked connection quality factor fails to meet the connection quality threshold of the network connection, may occur when a current geographic location is within a proximity of the recorded geographic location associated with the connection quality threshold.

Figure 7:
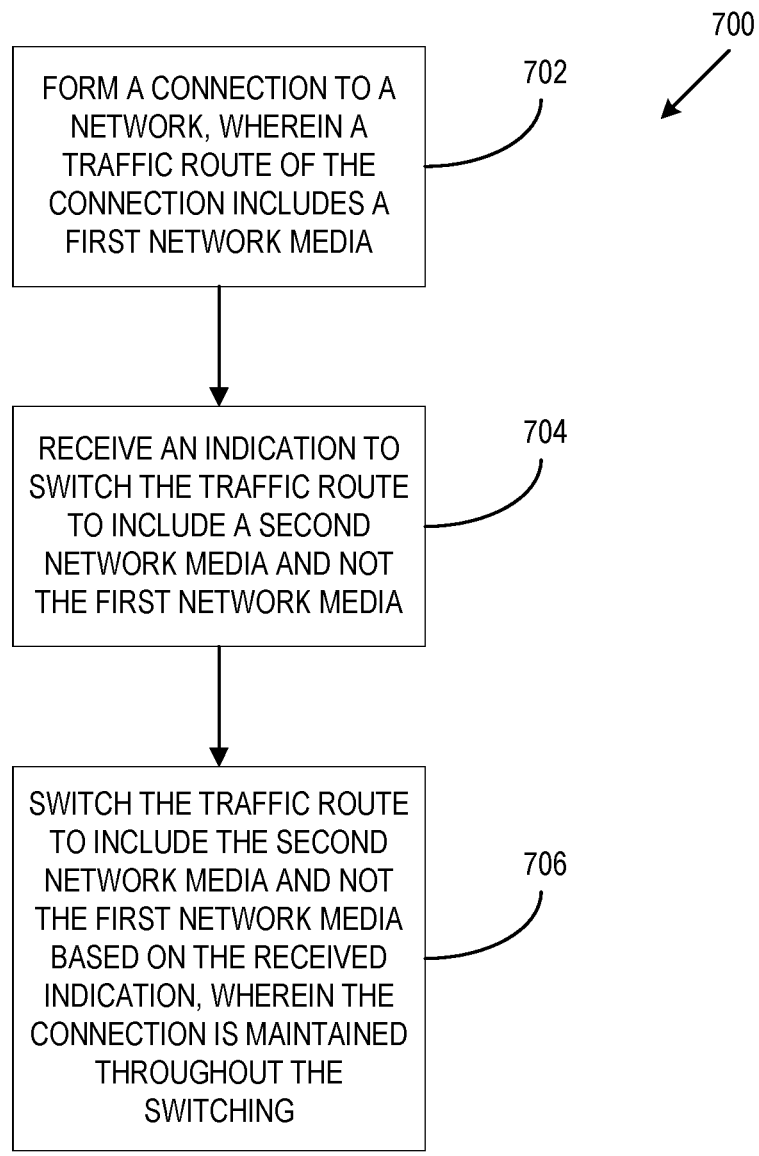
FIG. 7 illustrates a flow chart of an exemplary method of switching a traffic route of a connection from a first network media to a second network media while maintaining the connection.

FIG. 7 illustrates a flow chart of a method 700 of switching a traffic route of a connection from a first network media to a second network media while maintaining the connection. At 702, a connection is formed to a network, wherein a traffic route of the connection includes a first network media. At 704, an indication is received to switch the traffic route to include a second network media and not the first network media. At 706, the traffic route of the connection is switched to include the second network media and not the first network media based on the received indication, wherein the connection is maintained throughout the switching.

In an example, the connection is a TCP/IP connection, the first network media is associated with a 60 GHz Wi-Fi frequency channel, and the second network media is associated with at least one of a 2.4 GHz Wi-Fi frequency channel or a 5 GHz Wi-Fi frequency channel. Forming the connection to the network includes associating the connection with an IP address, which is maintained throughout switching the traffic route.

In a particular example, the first network media is associated with the IEEE 802.11ad standard and the second network media is associated with the IEEE 802.11ac standard.

In operation, prior to forming the connection to the network, the first network media is identified as available for connection and a connection interface associated with the first network media is provided from a network media multiplexer to a network layer associated with the network protocol. Forming the connection includes forming a connection according to the network protocol in the network layer associated with the network protocol using the provide connection interface.

In a further example, the connection interface is maintained throughout the switching of the traffic route.

Figure 8:
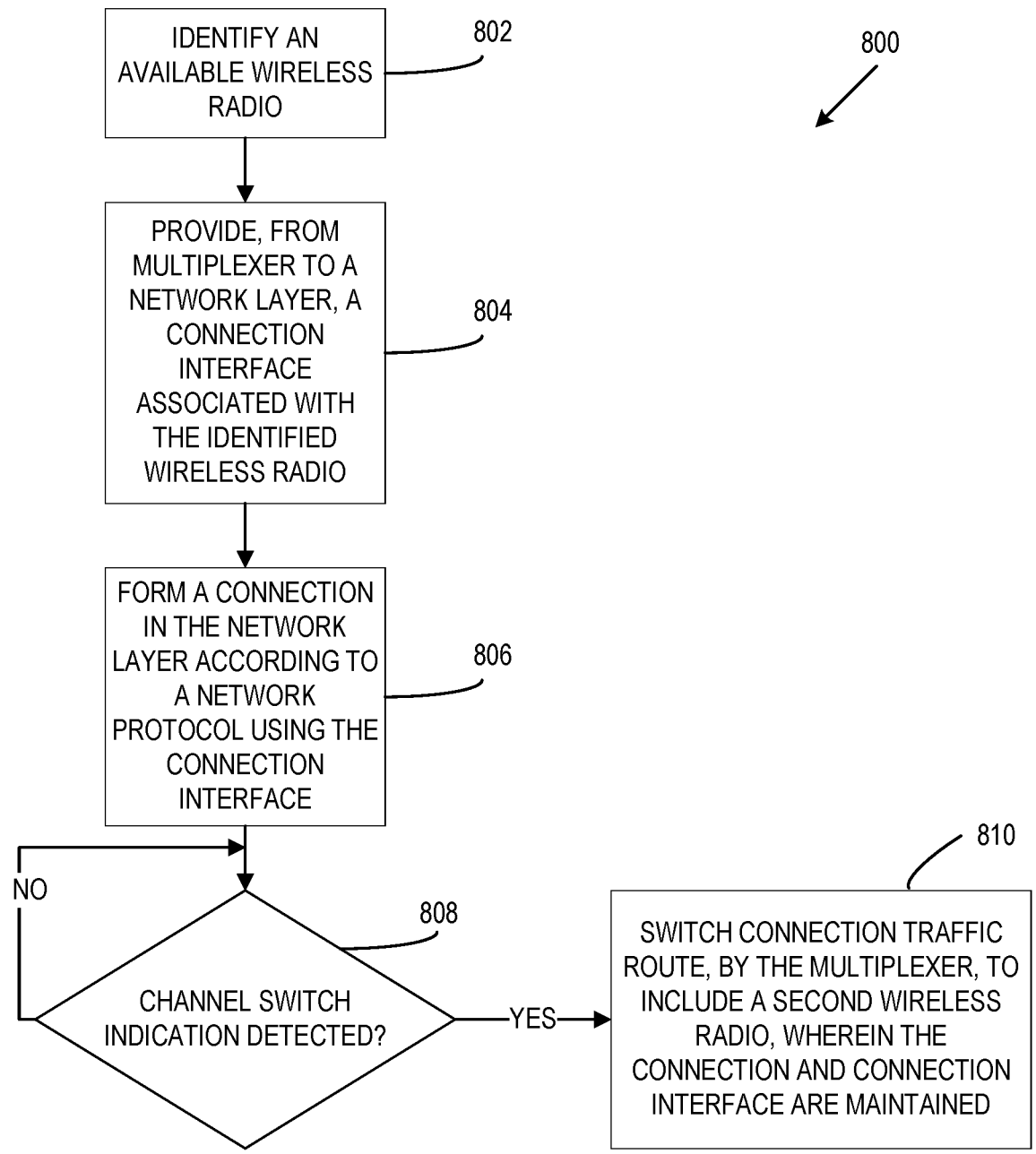
FIG. 8 illustrates a flow chart of an exemplary method of switching, by a multiplexer, a traffic route of a connection from a first network media to a second network media while maintaining the connection.

FIG. 8 illustrates a flow chart of a method 800 of switching, by a multiplexer, a traffic route of a connection from a first network media to a second network media while maintaining the connection. At 802, an available wireless radio is identified. At 804, a connection interface associated with the identified wireless radio is provided from a multiplexer to a network layer. At 806, a connection is formed in the network layer according to a network protocol using the connection interface. If, at 808, a channel switch indication is detected, a connection traffic route is switched, at 810, by the multiplexer, to include a second wireless radio, and the connection and connection interface are maintained throughout the switching. If, at 808, a channel switch indication is not detected, monitoring for a channel switch indication continues.

In an example, a first network media interface, associated with a wireless radio, is selected from a plurality of network media interfaces. A network connection is formed and network traffic of the network connection is routed over the selected network media interface. When a channel switch indication is determined, the network traffic is routed over a second network media interface of the plurality of network media interfaces and the network connection is maintained throughout the process.

In a further example, the network connection is a TCP/IP, the first network media interface is associated with a 60 GHz Wi-Fi frequency channel, and the second network media interface is associated with at least one of a 2.4 GHz Wi-Fi frequency channel or a 5 GHz Wi-Fi frequency channel. Forming a network connection includes associating the network connection with an IP address which is maintained throughout routing the network traffic over a second network media interface.

In a further example, an intermediate connection interface associated with the selected first network media interface is provided from a network media multiplexer to a network layer associated with a network protocol. Further, the network connection is formed according to the network protocol in the network layer associated with the network protocol using the provided intermediate connection interface.

In a further example, the intermediate connection interface is maintained throughout routing the network traffic over the second network media interface.

Figure 9:
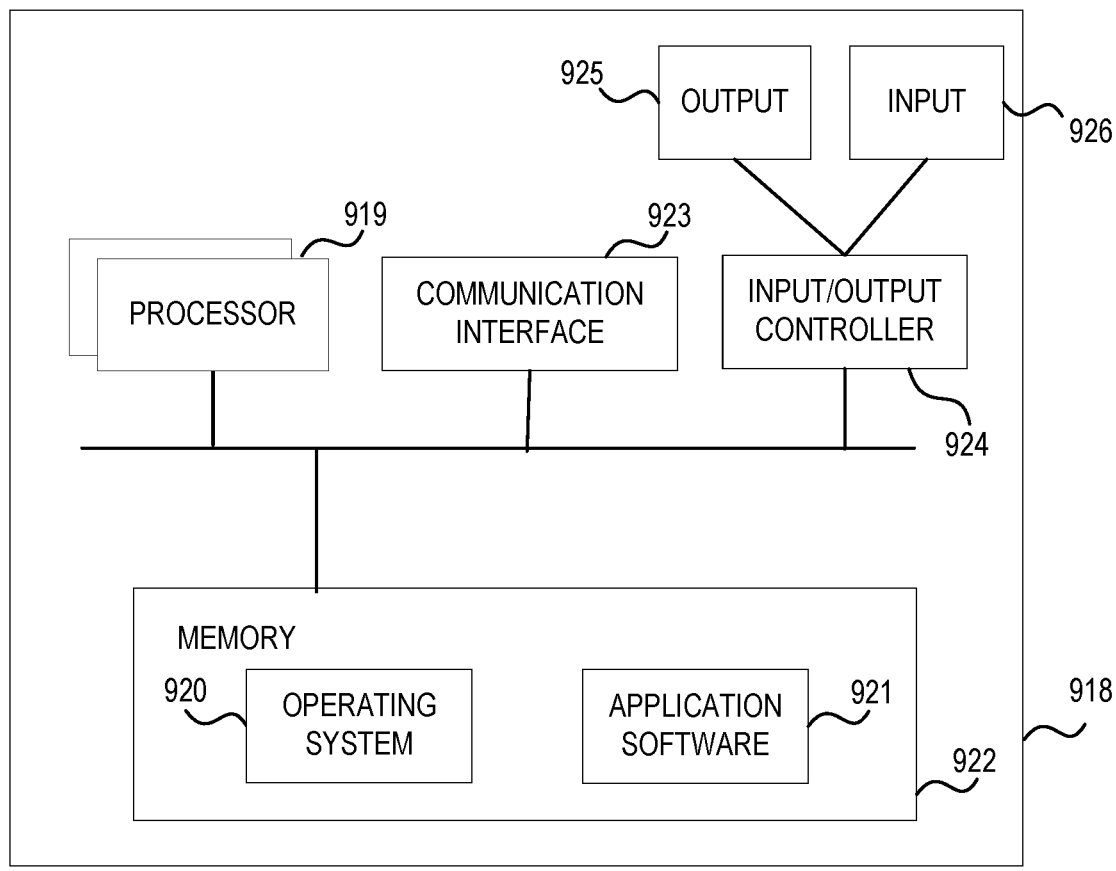
FIG. 9 illustrates an exemplary computing apparatus as a functional block diagram.

FIG. 9 illustrates a computing apparatus 918 as a functional block diagram. In an embodiment, components of a computing apparatus 918 may be implemented as a part of an electronic device and/or computing device according to one or more embodiments described in this specification. The computing apparatus 918 comprises one or more processors 919 which may be microprocessors, controllers or any other suitable type of processors for processing computer executable instructions to control the operation of the electronic device. Platform software comprising an operating system 920 or any other suitable platform software may be provided on the apparatus 918 to enable application software 921 to be executed on the device. According to an embodiment, determining when to switch between multiple network interfaces based on connection quality and/or predefined switching policy set by an administrator and seamlessly switching between the network interfaces may be accomplished by the operating system 920 and/or the application software 921. Furthermore, any of the software components may receive network traffic from other computing devices via a network or other communication link. Consequently, these software components may allow and/or deny network traffic based on the network security policy enforcement described herein.

Computer executable instructions may be provided using any computer-readable media that are accessible by the computing apparatus 918. Computer-readable media may include, for example, computer storage media such as a memory 922 and communications media. Computer storage media, such as a memory 922, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 922) is shown within the computing apparatus 918, it will be appreciated by a person skilled in the art, that the storage may be distributed or located remotely and accessed via a network or other communication link (e.g. using a communication interface 923).

The computing apparatus 918 may comprise an input/output controller 924 configured to output information to one or more output devices 925, for example a display or a speaker, which may be separate from or integral to the electronic device. The input/output controller 924 may also be configured to receive and process an input from one or more input devices 926, for example, a keyboard, a microphone or a touchpad. In one embodiment, the output device 925 may also act as the input device. An example of such a device may be a touch sensitive display. The input/output controller 924 may also output data to devices other than the output device, e.g. a locally connected printing device.

The functionality described herein can be performed, at least in part, by one or more hardware logic components. According to an embodiment, the computing apparatus 918 is configured by the program code when executed by the processor 919 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, embedded devices, etc.

Alternatively, or in addition to the other examples described herein, examples include any combination of the following:

An electronic device comprising:
a first wireless radio configured for a first frequency channel;
a second wireless radio configured for a second frequency channel;
at least one processor; and
at least one memory comprising computer program code, the at least one memory and the computer program code configured to, with the at least one processor, cause the electronic device to at least perform:
form a connection according to a network protocol, wherein a connection traffic route of the connection includes the first wireless radio; and
switch the connection traffic route, by a multiplexer, to include the second wireless radio when a channel switch indication is detected, wherein the connection is maintained throughout the switch.

The electronic device described above wherein the network protocol is transmission control protocol/Internet protocol (TCP/IP).

The electronic device described above wherein the first frequency channel is a 60 GHz Wi-Fi frequency channel and the second frequency channel includes at least one of a 2.4 GHz Wi-Fi frequency channel or a 5 GHz Wi-Fi frequency channel.

The electronic device described above wherein forming a connection according to a network protocol includes associating an Internet protocol (IP) address with the electronic device; and wherein the IP address associated with the electronic device is maintained throughout switching the connection traffic route.

The electronic device described above wherein the first wireless radio is configured for the IEEE 802.11ad standard and the second wireless radio is configured for the IEEE 802.11ac standard.

The electronic device described above wherein the at least one memory and the computer program code configured to, with the at least one processor, further cause the electronic device to at least perform:
identify the first wireless radio as available for connection; and
provide, from the multiplexer to a network layer associated with the network protocol, a connection interface associated with the identified first wireless radio;
wherein forming a connection according to the network protocol includes forming a connection according to the network protocol in the network layer associated with the network protocol using the provided connection interface.

The electronic device described above wherein the connection interface is maintained throughout the switching of the connection traffic route.

A computerized method comprising:
forming, by a processor, a connection to a network, wherein a traffic route of the connection includes a first network media;
receiving, by the processor, an indication to switch the traffic route to include a second network media and not the first network media; and
switching, at a network media multiplexer, the traffic route to include the second network media and not the first network media based on the received indication, wherein the connection is maintained throughout the switching.

The computerized method described above wherein the connection is formed according to transmission control protocol/Internet protocol (TCP/IP).

The computerized method described above wherein the first network media is associated with a 60 GHz Wi-Fi frequency channel and the second network media is associated with at least one of a 2.4 GHz Wi-Fi frequency channel or a 5 GHz Wi-Fi frequency channel.

The computerized method described above wherein forming a connection to a network includes associating the connection with an Internet protocol (IP) address; and wherein the IP address associated with the connection is maintained throughout switching the traffic route.

The computerized method described above wherein the first network media is associated with IEEE 802.11ad standard and the second network media is associated with IEEE 802.11ac standard.

The computerized method described above further comprising:
identifying, by the processor, the first network media as available for connection; and
providing, from the network media multiplexer to a network layer associated with a network protocol, a connection interface associated with the identified first network media;
wherein forming a connection includes forming a connection according to the network protocol in the network layer associated with the network protocol using the provided connection interface.

The computerized method described above wherein the connection interface is maintained throughout the switching of the traffic route.

One or more computer storage media having computer-executable instructions that, upon execution by a processor, cause the processor to at least:
select a first network media interface of a plurality of network media interfaces;
form a network connection, wherein network traffic of the network connection is routed over the selected network media interface;
when a channel switch indication is determined, route the network traffic over a second network media interface of the plurality of network media interfaces, wherein the network connection is maintained.

The one or more computer storage media described above wherein the network connection is formed according to transmission control protocol/Internet protocol (TCP/IP).

The one or more computer storage media described above wherein the first network media interface is associated with a 60 GHz Wi-Fi frequency channel and the second network media interface is associated with at least one of a 2.4 GHz Wi-Fi frequency channel or a 5 GHz Wi-Fi frequency channel.

The one or more computer storage media described above wherein forming a network connection includes associating the network connection with an Internet protocol (IP) address; and wherein the IP address associated with the connection is maintained throughout routing the network traffic over a second network media interface.

The one or more computer storage media described above having computer-executable instructions that, upon execution by a processor, further cause the processor to at least:
provide, from a network media multiplexer to a network layer associated with a network protocol, an intermediate connection interface associated with the selected first network media interface;
wherein forming a network connection includes forming a network connection according to the network protocol in the network layer associated with the network protocol using the provided intermediate connection interface.

The one or more computer storage media described above wherein the intermediate connection interface is maintained throughout routing the network traffic over the second network media interface.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for switching seamlessly between network media. For example, the illustrated one or more processors 919 together with the computer program code stored in memory 922 constitute the exemplary means.

The term "comprising" is used in this specification to mean including the feature(s) or act(s) followed thereafter, without excluding the presence of one or more additional features or acts.

The invention claimed is:

1. An electronic device comprising:
a first wireless radio;
a second wireless radio;
a multiplexer providing an intermediate connection interface;
at least one processor; and
at least one memory comprising computer program code, that when executed by the at least one processor, causes the at least one processor to perform the following operations:
form a connection according to a network protocol, wherein a route of the connection includes the first wireless radio and the intermediate connection interface;
cause the multiplexer to switch the route of the connection to include the second wireless radio and the intermediate interface and not include the first wireless radio; and
maintain the connection throughout the switch by causing the route of the connection to include the intermediate connection interface throughout the switch.

2. The electronic device of claim 1, wherein the network protocol is transmission control protocol/Internet protocol (TCP/IP); and wherein TCP/IP layers are insulated from the switch by the multiplexer.

3. The electronic device of claim 1, wherein the first wireless radio is configured for a first frequency channel that is a 60 GHz Wi-Fi frequency channel and the first wireless radio is configured for a second frequency channel that includes at least one of a 2.4 GHz Wi-Fi frequency channel or a 5 GHz Wi-Fi frequency channel.

4. The electronic device of claim 1, wherein forming a connection according to a network protocol includes associating an Internet protocol (IP) address with the electronic device; and
wherein the IP address associated with the electronic device is maintained throughout switching the route of the connection.

5. The electronic device of claim 1, wherein the first wireless radio is configured for the IEEE 802.11ad standard and the second wireless radio is configured for the IEEE 802.11ac standard.

6. The electronic device of claim 1, wherein the at least one memory and the computer program code configured to, with the at least one processor, further cause the electronic device to at least perform:
identify the first wireless radio as available for connection; and
provide, from the multiplexer to a network layer associated with the network protocol, a connection interface associated with the identified first wireless radio;
wherein forming a connection according to the network protocol includes forming a connection according to the network protocol in the network layer associated with the network protocol using the provided connection interface.

7. The electronic device of claim 6, wherein the connection interface is maintained throughout the switching of the route of the connection.

8. A computerized method comprising:
forming, by a processor, a connection to a network, wherein a route of the connection includes a first network media and an intermediate connection interface;
receiving, by the processor, an indication to switch the route of the connection to include a second network media and the intermediate interface and not the first network media; and
causing a multiplexer to switch the route of the connection to include the second network media and the intermediate interface and not the first network media based on the received indication; and
maintaining the connection throughout the switch by causing the route of the connection to include the intermediate connection interface throughout the switch.

9. The computerized method of claim 8, wherein the connection is formed according to transmission control protocol/Internet protocol (TCP/IP); and wherein TCP/IP layers are insulated from the switch by the multiplexer.

10. The computerized method of claim 8, wherein the first network media is associated with a 60 GHz Wi-Fi frequency channel and the second network media is associated with at least one of a 2.4 GHz Wi-Fi frequency channel or a 5 GHz Wi-Fi frequency channel.

11. The computerized method of claim 8, wherein forming a connection to a network includes associating the connection with an Internet protocol (IP) address; and
wherein the IP address associated with the connection is maintained throughout switching the route of the connection.

12. The computerized method of claim 8, wherein the first network media is associated with IEEE 802.11ad standard and the second network media is associated with IEEE 802.11ac standard.

13. The computerized method of claim 8, further comprising:
identifying, by the processor, the first network media as available for connection; and
providing, from the multiplexer to a network layer associated with a network protocol, the intermediate connection interface associated with the identified first network media;
wherein forming a connection includes forming a connection according to the network protocol in the network layer associated with the network protocol using the intermediate connection interface.

14. The computerized method of claim 13, wherein the intermediate connection interface is maintained throughout the switching of the traffic route.

15. One or more computer storage media having computer-executable instructions that, upon execution by a processor, cause the processor to at least:
forming, by a processor, a connection to a network, wherein a route of the connection includes a first network media and an intermediate connection interface;
receiving, by the processor, an indication to switch the route of the connection to include a second network media and the intermediate interface and not the first network media; and
causing a multiplexer to switch the route of the connection to include the second network media and the intermediate interface and not the first network media based on the received indication; and
maintaining the connection throughout the switch by causing the route of the connection to include the intermediate connection interface throughout the switch.

16. The one or more computer storage media of claim 15, wherein the connection is formed according to transmission control protocol/Internet protocol (TCP/IP); and
wherein TCP/IP layers are insulated from the switch by the multiplexer.

17. The one or more computer storage media of claim 15, wherein the first network media interface is associated with a 60 GHz Wi-Fi frequency channel and the second network media interface is associated with at least one of a 2.4 GHz Wi-Fi frequency channel or a 5 GHz Wi-Fi frequency channel.

18. The one or more computer storage media of claim 15, wherein forming the connection includes associating the connection with an Internet protocol (IP) address.

19. The one or more computer storage media of claim 15, having computer-executable instructions that, upon execution by a processor, further cause the processor to at least:
provide, from the multiplexer to a network layer associated with a network protocol, the intermediate connection interface;
wherein forming the connection includes forming the connection according to the network protocol in the network layer associated with the network protocol using the provided intermediate connection interface.

20. The one or more computer storage media of claim 19, wherein the intermediate connection interface is maintained throughout the switch.

* * * * *